United States Patent [19]

Legris

[11] 4,177,972
[45] Dec. 11, 1979

[54] COCKS HAVING ROTATING MANIPULATION SPINDLES

[75] Inventor: André Legris, St-Maur, France

[73] Assignee: Societe Legris France S.A., Ozoir-La-Ferriere, France

[21] Appl. No.: 747,042

[22] Filed: Dec. 2, 1976

[30] Foreign Application Priority Data

Dec. 18, 1975 [FR] France ............... 75 38893

[51] Int. Cl.² ............................................. F16K 51/00
[52] U.S. Cl. ........................................ 251/288; 151/69; 251/214; 251/230; 251/315
[58] Field of Search ............... 151/41.75, 69; 251/89, 251/90, 91, 92, 93, 214, 286, 288, 315, 230, 287, 316, 317

[56] References Cited
U.S. PATENT DOCUMENTS

| 1,179,597 | 4/1916 | Zahner | 151/69 |
|---|---|---|---|
| 1,444,899 | 2/1923 | Authier | 251/91 |
| 2,578,608 | 12/1951 | Shull | 151/69 |
| 2,632,623 | 3/1953 | Colwell | 251/90 |
| 2,695,046 | 11/1954 | Tinnerman | 151/41.75 |
| 2,853,113 | 9/1958 | Flora et al. | 151/41.75 |
| 2,916,114 | 12/1959 | Flora | 151/41.75 |
| 2,940,496 | 6/1960 | Patten | 151/41.75 |
| 3,138,187 | 6/1964 | Jaworski | 151/41.75 |
| 3,171,431 | 3/1965 | Hansen et al. | 251/317 |
| 3,260,989 | 7/1966 | Curtis | 151/69 |
| 3,572,383 | 3/1971 | Natalizia | 251/317 |
| 3,677,514 | 7/1972 | Mencarelli | 251/317 |
| 3,744,752 | 7/1973 | Massey | 251/288 |
| 3,746,301 | 7/1973 | Budzich et al. | 251/214 |

Primary Examiner—Martin P. Schwadron
Assistant Examiner—G. L. Walton
Attorney, Agent, or Firm—Bucknam and Archer

[57] ABSTRACT

Cocks having rotating manipulation spindles, comprising a body in which there is rotatably mounted a shut-off member connected by a spindle to a manipulation member, wherein the body of the cock has around the orifice of the bore in which the manipulation spindle is engaged a planar support surface defined at either side of the orifice by two parallel edges of a shape corresponding to that of the edges of a locking member of the spindle having a planar surface bearing against the said planar surface of the body and against a shoulder of the manipulation spindle which is flush with the planar surface of the body, the said locking member having a notch whereby the manipulation spindle is engaged. The invention is also concerned with a method of mounting the locking member of said cocks.

14 Claims, 24 Drawing Figures

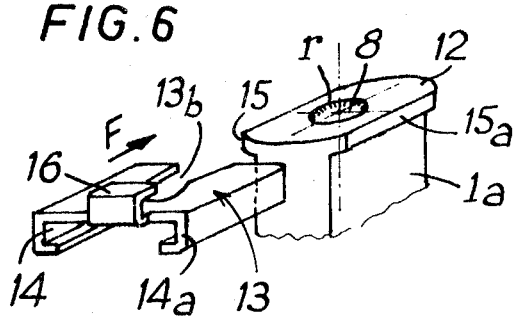
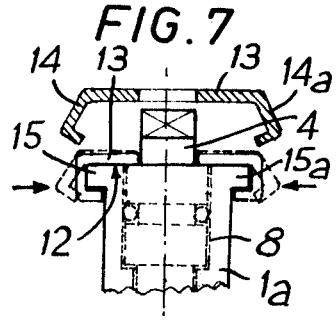
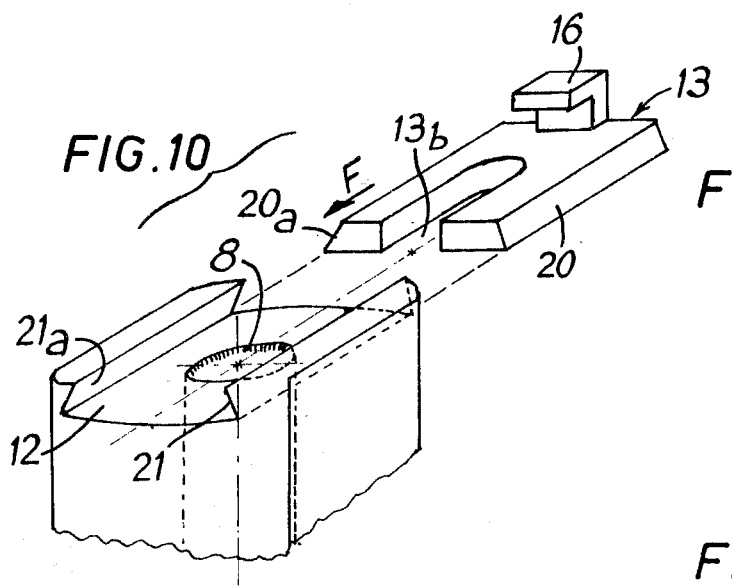
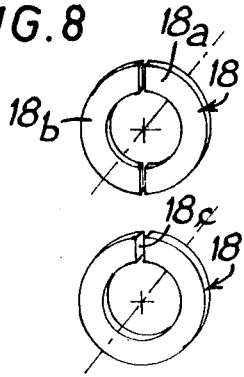
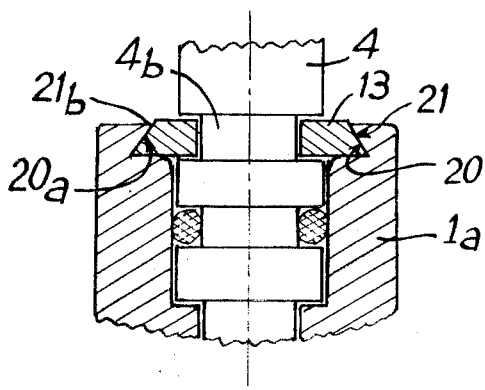

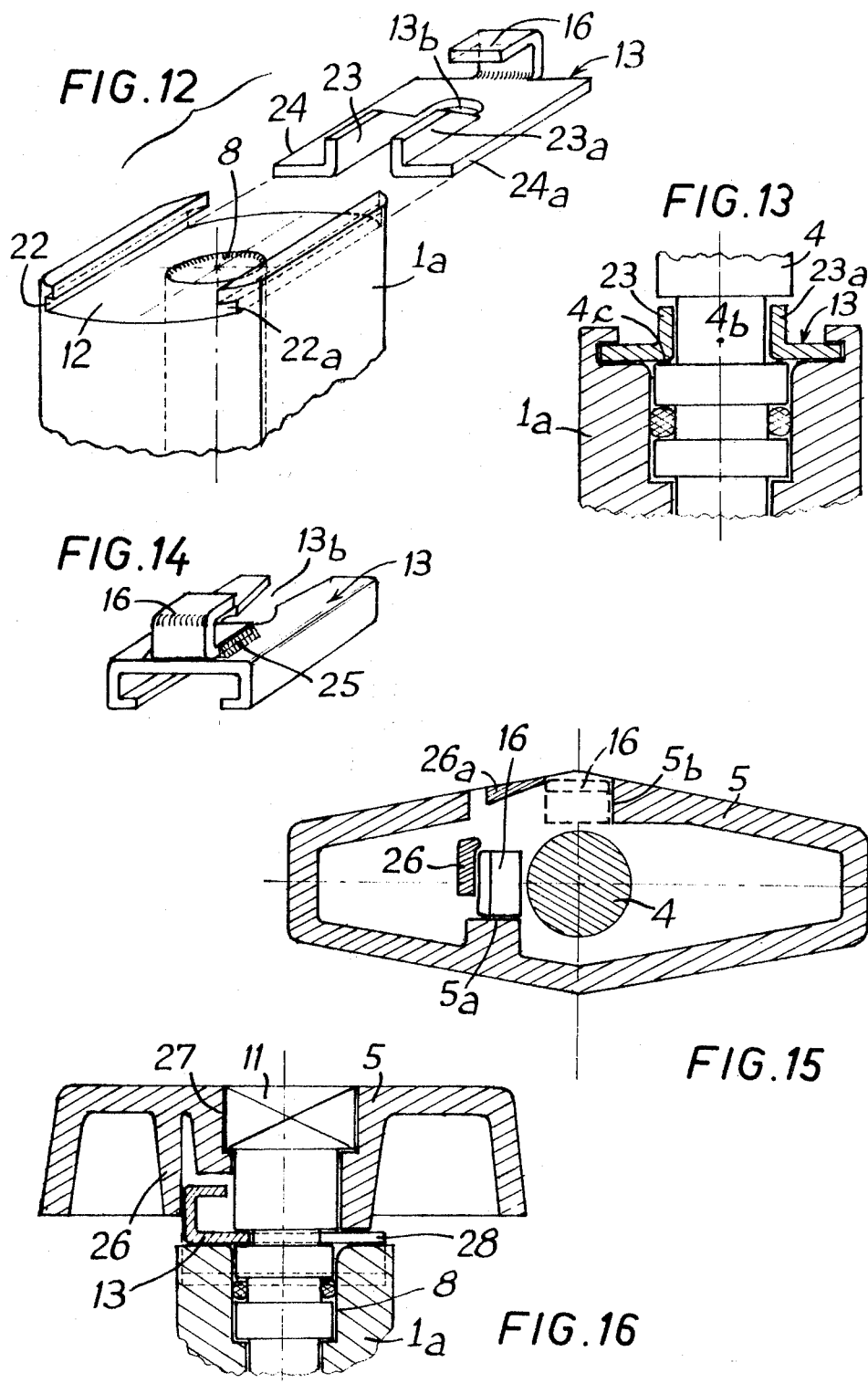

COCKS HAVING ROTATING MANIPULATION SPINDLES

The invention relates to an improvement to cocks or taps having a rotating manipulation spindle.

Cocks or taps generally comprise a body wherein there is rotatably mounted a shut-off member which is connected by a rotating spindle to a manipulation member exteriorly of the body.

The manipulation spindle which turns in the body is rendered immobile for translation in the latter by means of various devices such as bolts, screws, washers, sprung keepers, radial or tangential pins, encasings, or means bearing on a portion of the manipulation spindle and acting as turning stops.

It is also known to utilise flat or round clips in the shape of a fork or yoke which pass through the body of the tap so as to be engaged in a neck or a shoulder of the manipulation spindle in order to ensure its hold. These means which are economical under certain precise manufacturing conditions are employed to an ever increasing degree; but they have disadvantages which are an inevitable result of their conception. These disadvantages reside in the fact that the clearances in the body into which the clips are introduced in order to lock the manipulation spindle against translation motion are difficult to produce and necessitate an additional, costly machining operation of drilling or milling when bodies made of conventional metals are involved. Such machining is only avoided in bodies made of moulded plastics materials, but taps of this kind represent only a small percentage of those used in valves and fittings.

A further drawback resides in the fact that this machining operation at the intersection with the bore intended for the manipulation spindle causes the formation of sharp cutting angles and often of barbs which have to be fettled and which it would really be desirable to round off so as to enable the sealing joint to engage.

Fettling or deburring frequently requires an additional operation resulting in increased costs, but it is quite impossible to obtain a radius on the intersections at a reasonable cost. Recourse is then had to expedients which consist in providing a number of different diameters for the spindle housing and to reserve the smallest diameter for the seal. This solution greatly complicates the shapes of the housing and of the spindle but, above all, since the actual guidance of the spindle is reduced and less satisfactory, one is obliged to extend the insertion of the spindle in the body in order to obtain adequate guidance bearings.

The other devices mentioned above do not possess the disadvantages relating to the clips which pass through the body, but they have the drawback of being fairly expensive to machine and clearly more expensive to install.

The improved cock according to the invention enables the various above mentioned drawbacks to be obviated and its object is to provide a solution of an inexpensive assembly for installing the manipulation member, the rotating manipulation spindle and the elements which restrict the rotation.

In accordance with the present invention the body of the cock has around the orifice of the bore in which the manipulation rod is engaged a planar bearing surface defined at either side of the orifice by two parallel edges of a form corresponding to that of the edges of a member for locking the spindle having a planar surface bearing against the said planar surface of the body and against a shoulder of the manipulation spindle flush with the planar surface of the body, the said locking member having a notch whereby the manipulation spindle is engaged.

This arrangement enables the following advantages to be provided:

An assembly which comprises a small number of components: handle, manipulation spindle, locking member, seal, body of the cock;

Components of low unit cost;

A reduction of the costs of machining and casting by virtue of maximum simplification of shapes and total elimination of finishing or fettling and elimination of threads or tappings;

A reduction of the costs of assembling which is effected almost instantaneously;

A simple assembly of four integral pieces, handle, manipulation spindle, seal, simplifying spare parts and maintenance;

Rapid dismantling when desired;

Safety from inadvertent disassembling;

Simple and precise rotation abutments;

The possibility of notching in the extreme positions of rotation preventing accidental rotation caused by vibrations;

The manipulation handle (or wheel) cannot be lost, as a result of the adopted forms using neither screws, nor pins, nor other systems;

Application for cocks for running fluids, for vacuum, for the most usual pressures and temperatures;

Application for cocks for any fluid, elevated pressures and temperatures with adaptations.

Other characteristics and advantages of the invention will become better understood upon reading the following description of a number of exemplary embodiments and referring to the accompanying drawings in which:

FIG. 6 is a view in perspective of a mode of mounting a locking member in a head of a tap body;

FIG. 7 is an elevational view of a further mode of mounting a locking member in the head of the cock;

FIG. 8 is a view in perspective of an antifriction washer having two slits;

FIG. 9 is a view in perspective of an antifriction washer having one slit;

FIG. 10 is a view in perspective of a modified embodiment of a locking member and its mounting in the tap head;

FIG. 11 is a view in transverse section of the locking member mounted in the body and shown in FIG. 10;

FIG. 12 is a view in perspective of a modified embodiment of a locking member and its mounting in the tap head;

FIG. 13 is a view in transverse section of the locking member mounted in the tap head and shown in FIG. 12;

FIG. 14 is a veiw in perspective of a locking member provided with an added stop notch;

FIG. 15 is a sectional view of a handle comprising two flexible tabs which cooperate with a stop notch;

FIG. 16 is a view in longitudinal section of a handle and of its mounting on the manipulation spindle;

Figure 1:
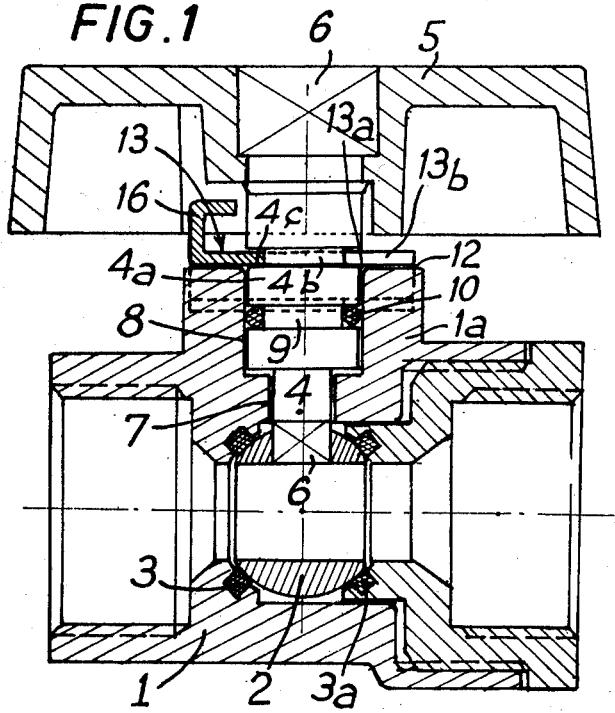
FIG. 1 is a view in longitudinal section of an improved cock according to the invention.
Figure 2:
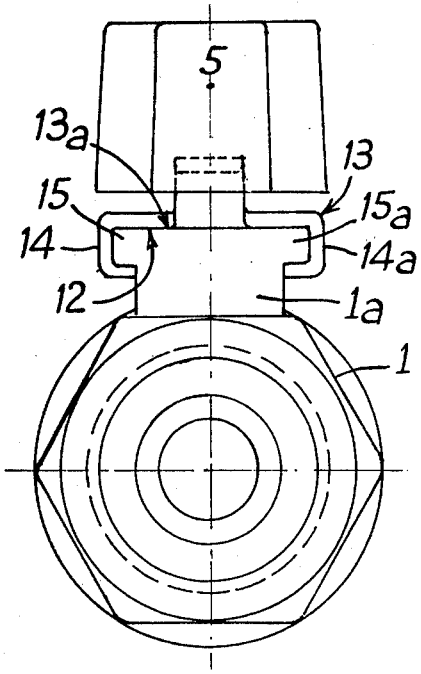
FIG. 2 is a side view of an improved cock according to the invention.

In FIGS. 1 and 2 there is shown a cock comprising a body 1 wherein there is rotatably mounted a spherical shut-off member 2 bearing against sealing gaskets 3, 3a and connected by a spindle 4 to an external manipulating member or handle 5, the said spindle being connected to the shutoff member by a square drive means 6.

The manipulation spindle 4 is engaged in a first bore 7 of the body and in a second bore 8 of larger diameter which opens at the outside of the body and is intended to receive a boss 4a of the spindle 4 having a neck 9 wherein a sealing gasket 10 is engaged.

At its upper portion the spindle 4 is rendered integral with the handle 5 by means of a square drive means 6 or any other equivalent means.

The body 1 of the cock is extended by a head 1a pierced by the bore 8 and having a planar surface 12 extending around the opening of the bore 8 and against which bears, by its planar surface 13a, a locking member 13 having a notch 13b (FIGS. 1 and 6) whereby it is engaged in a neck 4b of the spindle 4 the shoulder 4c of which is flush with the level of the surface 12 and bears on the surface 13a of locking member 13, thereby preventing any axial displacement of the spindle 4 while permitting its rotation by means of the handle 5.

The locking member 13 which is formed of a plate has two turned in parallel edges 14, 14a which form two channels in which the edges or flanges 15, 15a of corresponding shape, which are provided at either side of the opening of the bore 8 and which define the support surface 12 of the tap body, engage. On one of its edges the locking member has a folded over lug 16 which forms a stop notch or catch against which one of the faces of the handle 5 is adapted to abut so as to limit the rotation of the shut-off member 2 in well defined positions.

In FIG. 6 there is shown a method of mounting the locking element 13 on the head 1a of the body and wherein the locking member 13 is caused to slide on the body head 1a following the arrow F, in a plane which is perpendicular to the axis of manipulation, thus bringing the support face 12 of the body in coincidence with the surface 13a of the locking member and the edges or flanges 15, 15a of the body with the turned in edges or channels 14, 14a of the locking member 13 in such a way as to bring about a calculated tightening of the locking piece on the body.

The mounting must always be effected when the manipulation spindle 4 is mounted in the bores 7 and 8 of the body, the boss 4a of the spindle being flush with the surface 12 of the body, with its shoulder 4c at the same level.

The sliding movement is stopped when the bottom portion of the notch 13b of the locking member 13 abuts the spindle 4.

It can be seen that this method of assembly is simple and very economical, since it is to all intents and purposes instantaneous, robust, requires no finishing machining and simultaneously provides the hold of the spindle and a precise stop notch. It is interesting to emphasize that the edge or edges of the body 1 and the portions of the locking member clamped thereat should also have the property of preventing any rotary entrainment of the member 13 about the manipulation axis, the member 13 thus being forcibly held against the torques resulting from the exertions of the manipulation handle exerted on the abutments of the stop notch.

A different method of fitting the locking member 13 is illustrated in FIG. 7. In this method the edge portions 14, 14a are prepared in a spread apart manner so as to be engaged on the flanges 15, 15a of the head 1a of the body, as is shown in broken lines in FIG. 7, the locking member 13 being in contact with the supporting surface 12 of the body and the spindle 4 being engaged in the notch 13b.

The edge portions 14, 14a are then turned down over the flanges or ribs 15, 15a of the body by deformation by means of pliers or a suitable tool.

This manner of assembly is performed simultaneously and is very fast and efficient. Furthermore, it has the same advantages and characteristics as those described in conjunction with the preceding method.

Figure 3:
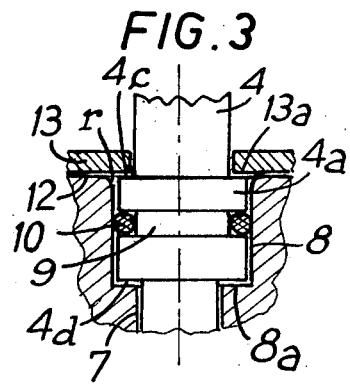
FIG. 3 is a view in partial section showing the housing of the manipulating spindle equipped with a rotating O-ring.

In FIG. 3 there is shown a spindle 4 the boss 4a of which is disposed in the bore 8 and its surface 4d is at one side supported by a shoulder 8a of the body and at the other side by a shoulder 4c against the surface 13a of the locking member 13, the shoulder 4c being flush with the bearing surface 12 of the body. This arrangement enables the boss 4a to be held captive between the body and the locking member so as to prevent any axial displacement of the manipulation spindle 4.

A neck 9 in which a sealing gasket 10 is engaged is provided on the boss 4a. An entry radius r for the engagement of the gasket 10 is provided on the orifice of the bore 8.

Figure 4:
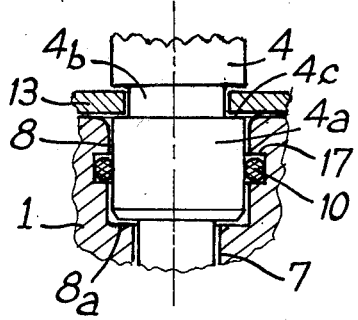
FIG. 4 is a view similar to FIG. 3 but with a seal installed in the body.

A further embodiment of the spindle 4 is illustrated in FIG. 4 wherein a neck 4b is provided in which the locking member 13 is engaged, one of the surfaces 4c of the neck forming the shoulder supporting the locking member. The sealing gasket 10 is disposed in a neck 17 fashioned in the body 1 of the cock.

In accordance with FIGS. 3 and 4 it is important to note that the usuful guidance for the spindle and the tightness require a bore 8 the diameter of which is equal or similar to the depth of the bore.

Although an O-ring seal has been shown, any other kind of gasket may be employed.

Figure 5:
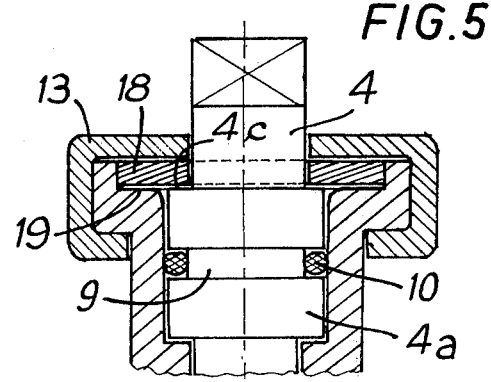
FIG. 5 is a view in partial section of a variant of FIG. 3 and comprising an anti-friction washer.

In FIG. 5 there is shown a modification of the embodiment of FIG. 3 in which an anti-friction washer or disc 18 is disposed in a housing 19 of the head 1a of the body, the said washer being made of a suitable material and sandwiched between the shoulder 4c of the boss 4a of the spindle 4 and the lower surface of the locking member 13.

This arrangement makes it possible to improve the ratary friction under the thrust of the pressure of the shoulder 4c of the manipulation spindle and to withstand major pressures and great friction forces during rotation.

FIG. 8 shows an anti-friction washer 18 which, however, is divided into two half-washers 18a, 18b severing, whereby an anti-friction washer can be fitted on the manipulation spindle which has a neck 4b.

This arrangement of two half-washers 18a, 18b permits the assembly to be effected much more easily than with a washer consisting of a single piece.

FIG. 9 shows a further embodiment of a washer 18 having a slit 18c which imparts greater flexibility thereto. Also in this case the washer 18 can be fitted on a spindle comprising a simple neck 4b.

FIGS. 10 and 11 illustrate a modified embodiment of the locking member 13 which is formed of a plate having a notch 13b for engagement of the spindle 4, by its neck 4b, on the locking member. The locking member has two sloping parallel edges 20, 20a which are engaged in the head 1a of the body in a dove-tail shaped slit the base of which is formed of the bearing surface 12 and the edges by the grooves 21, 21a having sloping faces.

In this case assembly and dismantling are performed by sliding according to the arrow F.

FIGS. 12 and 13 show an embodiment in which the locking member 13 is formed of a plate having a notch 13b in which the neck 4b of the spindle is engaged. The edges of the plate are engaged in parallel grooves 22, 22a provided in the head 1a of the body, to either side of the bearing surface 12.

The rims of the notch 13b are provided with reinforcing ribs 23, 23a which are engaged in the neck 4b, the locking member being supported on the shoulder 4c of the spindle so as to ensure its blocking in translation.

The method of mounting consists in causing the edges 24, 24a of the locking member to slide in the grooves 22, 22a, thus causing the lower surface of the locking member 13 to coincide with the support face 12 until the bottom of the notch 13b abuts against the spindle 4.

In FIG. 14 there is shown a locking member 13 of the kind illustrated in FIGS. 1 and 2 and showing a lug 16 which forms a stop notch added to the locking member 13 by welding. The lug 16 may have a variety of shapes and in particular it may be employed to strengthen the member 13 in its central portion, by doubling its thickness.

FIG. 15 shows a sectional view of the lower portion of the handle 5 at the level of the lug 16 serving as abutment of the notch stopping the rotation of the handle 5, the said lug being shown in full lines in a first position where it abuts a surface 5a of the handle, a resilient tab or tongue 26 integral with the handle ensuring its hold by ratchet action so as to prevent any inadvertent turning of the manipulation axis as a result of vibrations.

In a second position of the handle the lug 16 is shown in broken lines and abutting the surface 5b of the handle, the said handle having a resilient tab or tongue 26a which ensures the hold in blocked position.

FIG. 16 shows a method of mounting the handle 5 to the manipulation spindle 4 without any fastening means such as a screw, a pin or the like and imparting to the assembly advantages for the purpose of preventing the handle being broken off or lost.

The handle 5 has a squared housing 27 in which there is mounted a head 11 of the spindle 4 of corresponding shape, the said handle being held captive between the square head 11 and the upper surface 28 of the locking member 13. During assembly the handle 5 is engaged by its housing 27 on the head 11 of the manipulation spindle and the spindle is engaged in the bore 8 of the body, and subsequently the locking member 13 is engaged on the spindle 4 and supported by the body.

Figure 17:
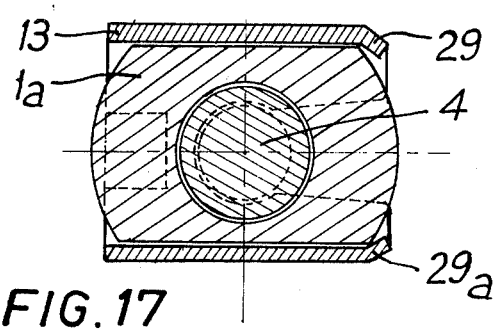
FIG. 17 is a sectional view of the head of the cock, perpendicular to the manipulating spindle, showing the crimping of the locking member.

FIG. 17 shows the head 1a of the body of the cock viewed in section perpendicular to the manipulation handle 4, the locking member 13 being secured to the body by crimped portions 29, 29a provided at one of the ends, so as to prevent any inopportune detachment.

Figure 18:
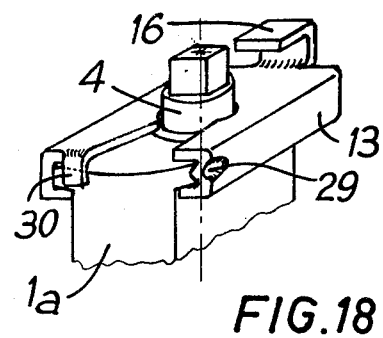
FIG. 18 is a view in perspective of the locking member and of its jamming by a bent down lug or a wedge-shaped crimped portion.

Other methods of jamming the locking member 13 are shown in FIG. 18, more particularly by means of a tab 30 of the locking member which is bent down onto the head 1a of the body. At the opposite side the locking member 13 is provided with a crimped portion 29 similar to that shown in FIG. 17.

Any other method of blocking or jamming the locking member may alternatively be employed.

Figure 19:
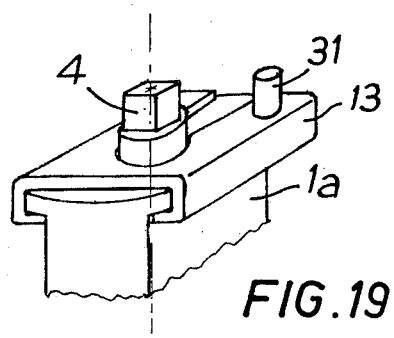
FIG. 19 is a view in perspective of a locking member through which passes a pin or a fastening screw which acts as a stop.

FIG. 19 shows the head 1a of the body to which the locking member 13 is mounted. The locking member has an aperture through which passes a screw 31 or a pin engaged in an aperture of the body by force-sleeving or by screwing. This screw or pin 31 is simultaneously utilised as a member linking the member 13 and the body 1 so as to prevent any detachment and as a stop for the handle.

Figure 20:
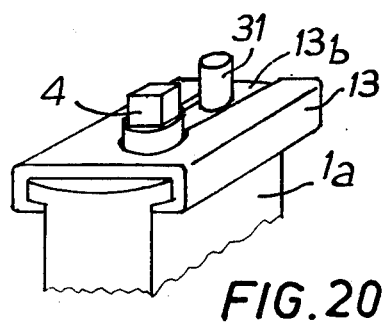
FIG. 20 is a view in perspective of a locking member comprising a pin or a fastening screw mounted in the notch.

A similar arrangement is shown in FIG. 20 where a screw or pin 31 is engaged in the notch 13b of the locking member and rendered integral with the head 1a of the body, the said pin acting as abutment of the stop notch.

Figure 21:
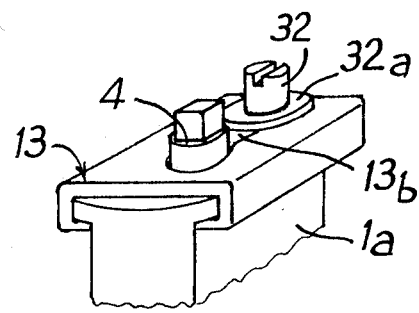
FIG. 21 is a view in perspective of a locking member comprising a fastening screw provided with a collar.

FIG. 21 shows an arrangement similar to that of FIG. 20 wherein a screw 32 is disposed in a tapped hole of the head 1a of the body, in the space occupied by the notch 13b.

This screw 32 comprises a collar 32a which bears on the locking member 13 and is intended to prevent inadvertent detachment, to provide increased resistance to the thrust of the spindle and to act as abutment for the stop notch of the handle.

Figure 22:
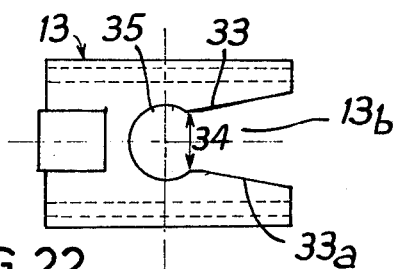
FIGS. 22 to 24 are plan view of the locking member showing various forms of notches.

In FIG. 22 there is shown an embodiment of the notch 13b in the locking member and which is defined by flanks 33, 33a arranged along two converging lines and an entry passage 34 which is slightly smaller than the circular orifice 35 intended to receive the spindle 4, so as to permit a weak snap-fit on the latter during assembly.

Figure 23:
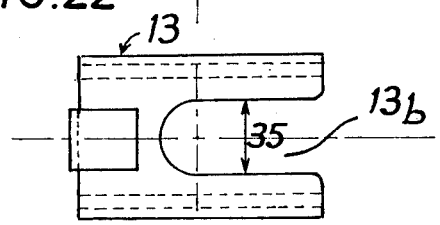

A further form of the notch 13b is shown in FIG. 23 and has two parallel edges providing a passage 35 of constant width superior to the diameter of the spindle 4.

Figure 24:
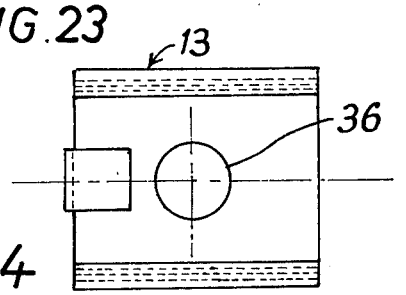

In FIG. 24 there is shown a further embodiment of the locking member which is employed in the assembly shown in FIG. 7 and wherein the spindle 4 is engaged in a simple, circular aperture 36. This element enables the cock or tap to be secured and to render it undetachable after having been assembled with the body 1.

It is obvious that without going beyond the scope of the invention the persons skilled in the art can make various modifications to the devices or methods which have been described merely by way of non-limiting examples.

What is claimed is:

1. A cock comprising a body, a spherical shut-off member rotatably mounted in the body, a spindle connecting said shut-off member to an external manipulation member, the body having a planar support surface, a locking member bearing against said planar support surface, said locking member having a notch which engages in a neck of the spindle, the shoulder of which is flush with the level of said planar surface, the surface of said locking member bearing against said planar surface of the body, said planar support surface of the body having two flanges which engage with the edges of the locking member, the locking member of the spindle is formed by a planar plate which extends across the entire diameter of said body, said planar plate having two turned down parallel edges which form two grooves into which there engage said flanges provided on the body of the cock to either side of planar support surface, and wherein the manipulation spindle comprises a circular neck wherein there are engaged the edges of the notch of the locking member, one of the surfaces of the neck forming the bearing shoulder.

2. A cock as defined in claim 1, wherein an anti-friction washer is disposed between the locking member and the shoulder provided on the spindle, the said washer being flush with the planar surface of the body of the cock.

3. A cock as defined in claim 2, wherein the washer has at least one slit facilitating its installation.

4. A cock as defined in claim 1, wherein the manipulation member is a handle and the locking member is provided with a unitary or added stop notch on said member which cooperates with bosses provided on said handle.

5. A cock as defined in claim 4, wherein the handle is held captive between a shoulder of an entrainment boss provided at the end of the spindle and the upper surface of the locking member.

6. A cock as defined in claim 4, characterised in that the abutment of the stop notch of the locking member cooperates with semi-rigid tongues provided on the handle so as to obtain a ratchet engagement of the rotary positions.

7. A cock as defined in claim 1, wherein the locking member is held on the body by crimped portions of its end of a smaller size than the corresponding one of the body.

8. A cock as defined in claim 1, wherein the locking member is held jammed in normal position by a lug provided on said member and turned down against the body of the cock.

9. A cock as defined in claim 1, wherein the locking member is held jammed on the body by a pin which is force-sleeved or screwed into an aperture provided in the planar support surface of the body and engaged in a orifice provided in the locking member.

10. A cock as defined in claim 9, wherein the pin forms a stop notch for the handle.

11. A cock as defined in claim 9, wherein the pin is engaged in an aperture of the body situated in the notch of the locking member.

12. A cock as defined in claim 11, wherein the pin screwed into an aperture tapped in the body has a collar which is held pressed against the locking member, the said pin forming at its upper portion a stop notch for the handle.

13. A cock as defined in claim 1, wherein the locking member is a plate having sloping edges and which is engaged in the body in a dove-tail shaped slit the base of which is formed by the support surface of the body and the edges by grooves of sloping sides.

14. A cock as defined in claim 1, wherein the locking member is formed by a plate the edges of which are engaged in parallel grooves provided to either side of the support surface of the body.

* * * * *